June 17, 1952    P. A. DERHAM    2,601,101
HINGE FOR MOLDED BOXES OR OTHER MOLDED ARTICLES
Filed Dec. 13, 1945    2 SHEETS—SHEET 1
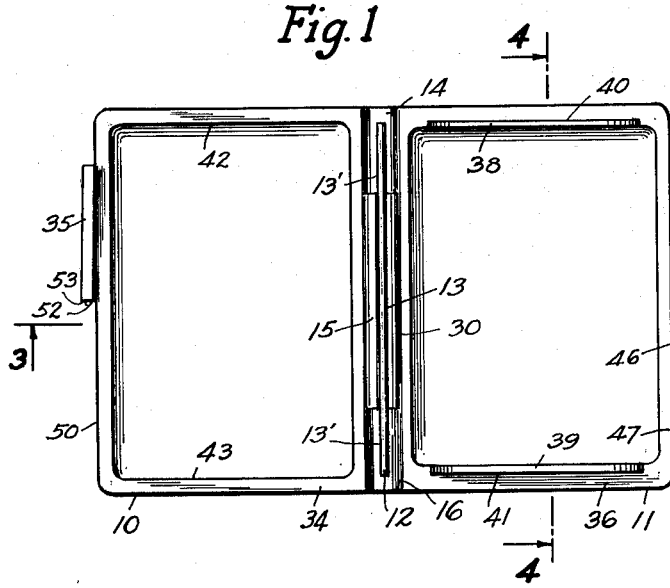
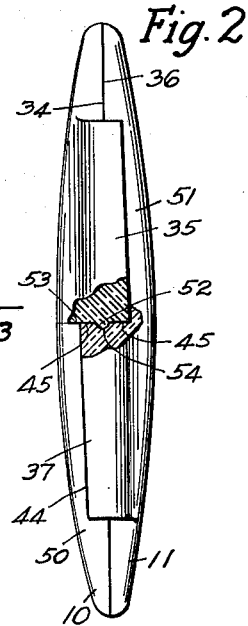
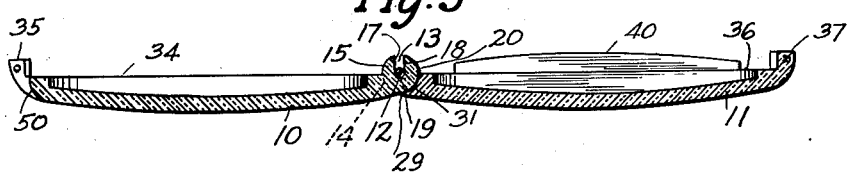
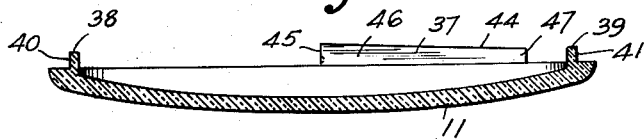
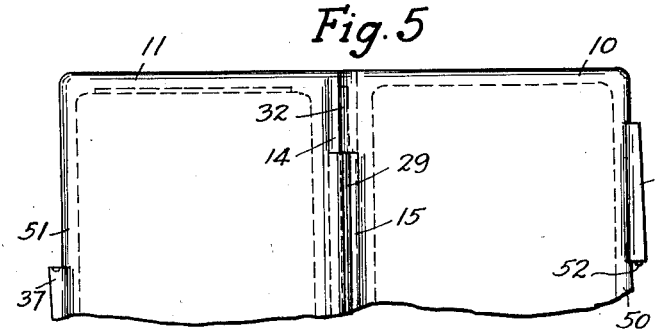
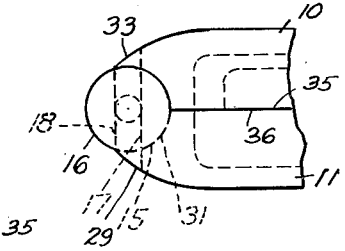
INVENTOR.
Philip A. Derham
BY Harry Jacobson
ATTORNEY June 17, 1952  P. A. DERHAM  2,601,101
HINGE FOR MOLDED BOXES OR OTHER MOLDED ARTICLES
Filed Dec. 13, 1945  2 SHEETS—SHEET 2
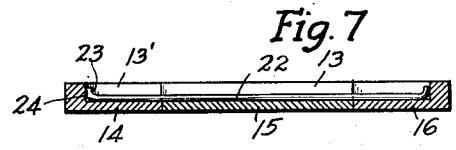
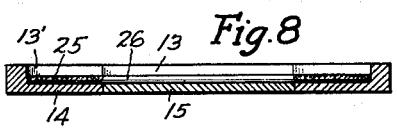
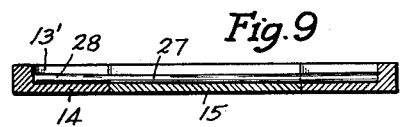
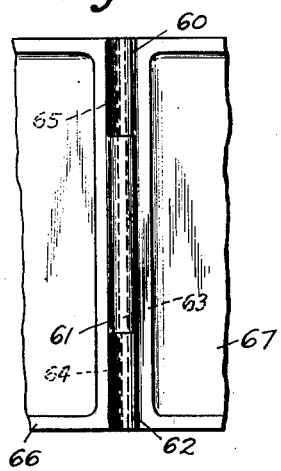
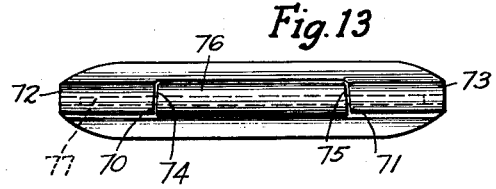
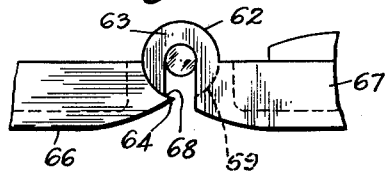
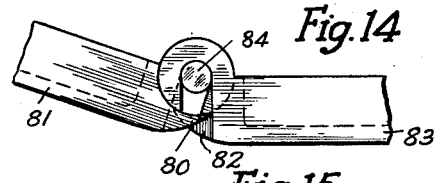
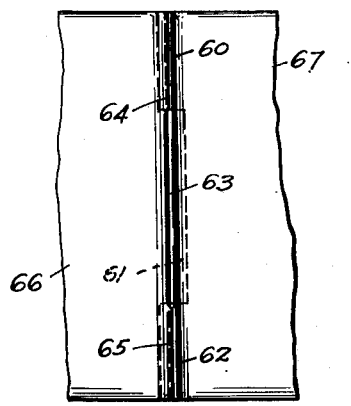
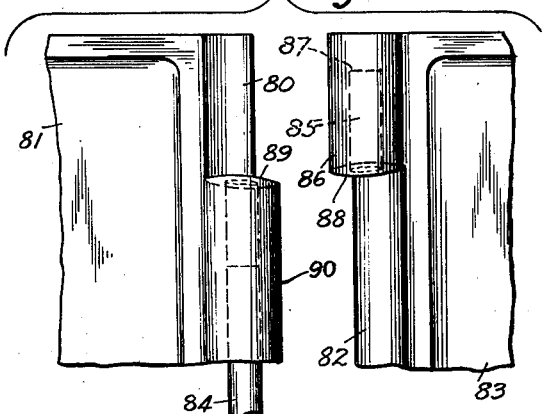
INVENTOR
Philip A. Derham
BY
ATTORNEY Patented June 17, 1952

2,601,101

UNITED STATES PATENT OFFICE 2,601,101

HINGE FOR MOLDED BOXES OR OTHER MOLDED ARTICLES

Philip A. Derham, Rosemont, Pa., assignor to Victor Metal Products Corporation, Brooklyn, N. Y., a corporation of New York Application December 13, 1945, Serial No. 634,693

12 Claims. (Cl. 16—128)

This invention relates to molded plastic boxes such as are adapted to be carried in the pocket, and particularly to that type of such boxes as has a hinge molded integrally therewith and which is provided with a hinge pin, whereby the entire box is made only of three parts.

The need has long been recognized for a lightweight and efficient but inexpensive hinged plastic box of good appearance and in which the cover and container parts may each be molded in finished form without the necessity for additional operations which add greatly and disproportionately to the cost.

However, insofar as I am aware, the means heretofore known for maintaining the hinge pin in the slots of moldable hinge members, or the means for preventing one of the box parts from becoming separated from the other, have proven to be either too expensive for boxes of the type involved, or have presented such difficulties in the manufacture and assembly of the parts as to require additional and prohibitively expensive operations with the result that plastic boxes have not heretofore been generally made or used, though their advantages have long been known.

The present invention therefore contemplates the provision of an inexpensive plastic pocket box consisting only of the cover part, the container part and a hinge pin, both parts being substantially finished in the forms in which they come out of the mold, being integrally formed with cooperating slotted hinge members, so that the cover part can be quickly and inexpensively assembled to the container part merely by aligning the slots of the hinge members and sliding or pressing the hinge pin thereinto.

The invention further contemplates the provision of simple means integral with at least one of the box parts for preventing the hinge pin from dropping out of the hinge slots and for preventing the parts from becoming separated from each other.

The invention further contemplates the provision of suitable overhanging lips on the box parts serving the double function of concealing the hinge pin and preventing separation of the parts.

The various objects of the invention will be clear from the description which follows and from the drawings, in which:

Fig. 1 is a top plan view of the box in its fully open position and embodying one form of the invention.

Fig. 2 is an enlarged side elevational view of the front edge portion of the box when in its closed position and partly broken away to show the latching elements of the catch.

Fig. 3 is a vertical sectional view of the box taken on the line 3—3 of Fig. 1.

Fig. 4 is a vertical section of the container part taken on the line 4—4 of Fig. 1.

Fig. 5 is a bottom plan view of the box, showing particularly the means for maintaining the box parts and the pin in their proper assembled relation.

Fig. 6 is a fragmentary end elevational view of the box in the closed position thereof.

Fig. 7 is a vertical longitudinal sectional view through the hinge pin showing a modified form of the pin and of the slots in the hinge members.

Figs. 8 and 9 are similar views of other modified forms of the pin.

Fig. 10 is a fragmentary top plan view of a modified form of the hinged portions of the box parts as they appear in the open position of the box.

Fig. 11 is a fragmentary enlarged end elevational view of the same.

Fig. 12 is a bottom plan view of the same.

Fig. 13 is a rear elevational view of another modified form of the box in the closed position thereof.

Fig. 14 is a view similar to Fig. 11 of another modified form of the overhanging lips on the rear edges of the box parts and showing the box open to the limit permitted by the lips.

Fig. 15 is a bottom plan view of the box parts shown in Fig. 14, showing said parts separated and the hinge pin partly withdrawn.

In the practical embodiment of the invention shown by way of example in Figs. 1 to 6, the cover part 10 of the box is hinged to the container part 11 as by means of the hinge pin 12 inserted into the slot 13 of the hinge member 15 of the cover part and into the slots 13' of the hinge members 14 and 16 of the container part. The members 14 and 16 are molded integrally with the container part 11 and are of generally cylindrical form, and are suitably spaced apart to receive therebetween the hinge member 15 which is similarly of generally cylindrical form and is molded integrally with the cover part 10. The slots 13' each have parallel sides 17 and 18 and a rounded or cylindrical bottom surface 19 concentric with the cylindrical outer surface 20 of the hinge member. Similarly, the slot 13 has parallel sides and a rounded bottom surface aligned with the bottom surface 19 when the box is open as shown in Figs. 1 and 3. Preferably however, the slot 13 is slightly wider than the slots 13' for the purpose soon to be described.

It will be noted that the slots 13 and 13' extend outwardly and to the surface 20 whereby it becomes possible to mold the hinge members with the container part or the cover part as the case may be, since each of the slots has an open side. In the form of the invention being described, the slots 13' in the end hinge members 14 and 16 are shorter than said members and do not extend to the extreme ends of the members, thereby leaving solid, unslotted and unmutilated end portions on the respective members 14 and 16 for better appearance. The slots 13 and 13' are in alignment as is shown in Figs. 1 and 3, when the box is open, and the side walls of said slots when aligned lie in preferably parallel planes. The hinge pin 12 is made preferably, though not necessarily of metal, and of such diameter as to fit tightly into the somewhat smaller slots 13' and with a sliding fit into the slightly larger slot 13, said pin being also of substantially the same length as the overall length of the aligned slots. Hence the pin may easily be pressed into contact with the rounded surfaces at the bottoms of the slots by a radial movement, thereby to seat the pin quickly and inexpensively in its proper position in the various slots and to fix it to the part 11 for rotation therewith as a unit. The pin, however, rotates in the slot 13.

In Figs. 7, 8 and 9, I have shown other means for fixing or securing the hinge pin in the slots 13' for rotation with the container part. As shown in Fig. 7, the hinge pin 22 may have its ends 23 turned upwardly and spaced apart a sufficient distance to engage the end walls 24 of the slots 13' tightly, in which case the slots 13 and 13' may be made the same size if desired, since the pin is wedged between the end walls 24 and rotates with the part 11 regardless of whether or not it is tight in the slots 13'.

The same result may be obtained by keeping the slot 13 slightly wider than the slots 13' and knurling the end parts 25 of the hinge pin 26 as shown in Fig. 8. When the knurled ends are pressed into the slots 13', the pin becomes fixed in place. As shown in Fig. 9, the hinge pin 27 may be tapered to wider diameter at its end parts 28, thereby wedging it into the slots 13' when it is pressed thereinto to secure it to the part 11. In any case, it will be seen that the pin may readily be secured to the hinge members of the container part by the above described or other suitable means, and assembled to the cover part without the necessity for additional operations.

It will be noted that when the box parts 10 and 11 are rotated in either direction relatively to each other out of the positions thereof shown in Fig. 3, the slots 13' do not remain in alignment with the slots 13 as shown for example in Fig. 14. The frictional fit of the pin in the slots 13' serves to insure against the pin working its way outwardly out of the slots when the box is completely open. Owing, however, to the comparatively loose fit of the pin in the slot 13, the cover part 10 may become separated from the pin unless some means is provided to prevent such separation. Such means is provided and takes the form as shown in Fig. 3, of a rearwardly projecting or overhanging lip as 29 in the recess 30 of the part 11 and extending between the hinge members 14 and 16. The inner surface 31 of said lip is arcuate and of substantially the same diameter as that of the outer surface of the hinge member to contact with said outer surface. The lip 29 extends across the slot 13 when the box is closed as shown in Fig. 6, and when the box is open, extends past the vertical center line of the slot 13 as shown in Fig. 5. Consequently, when the box is open, the hinge member 15 rests on the lip and cannot move in any direction except that it may rotate around the pin. The lip thereby prevents the box parts from becoming separated from each other and maintains the cover part from separation from the pin. When the box is closed, the lip 29 conceals the open side of the slot 13, which is then arranged on the under side of the box.

Similar lips 32 and 33 project from the cover part on the respective opposite sides of the member 15 and have arcuate inner surfaces similar to the surfaces 31 and slidably engaging the outer surfaces of the hinge members 14 and 16 respectively. When the box is closed (Fig. 6) the lips 32 and 33 are at the top of the box and conceal the slots 13'. The hinge pin is therefore completely concealed when the box is closed and the hinge presents the general appearance of an ordinary hinge. Only when the box is open, are the slots and the pin visible.

It will be understood that the positions of the slots in the hinge members may be reversed, that is, the slots may extend downwardly when the box is open instead of upwardly, or the slots may be arranged at any convenient angle to the vertical provided that the pin may be easily inserted into place. In Figs. 10 to 15, I have shown the slots extending downwardly when the box is open and have also shown means for preventing separation of the parts, the pin being inserted longitudinally instead of laterally into the slots. Before proceeding with the detailed description of Figs. 10 to 15, the latch, catch and guiding elements which are common to all the forms of the invention will first be described.

The lowermost surface 34 of the cover part 10 is preferably flat, except where the hinge member 15 projects upwardly thereabove and where the catch member 35 is provided. Similarly, the uppermost surface 36 of the container part 11 is flat and adapted to engage the surface 34 when the box is closed. The surface 36 is interrupted by the hinge members 14 and 16 and by the catch member 37 and also by the upstanding guiding walls 38, 39, the outer surfaces 40 and 41 of which are adapted to engage the respective inner wall surfaces 42 and 43 of the cover part and to guide said cover part into its proper locked position. The walls 38 and 39 also aid in sealing the joint between the box parts when the box is closed.

The means for normally maintaining the parts in their closed positions will now be described. Said means comprises the similar catch members 35 and 37 disposed on opposite sides of the transverse center line of the box, and which are so shaped as to cooperate with each other and with the respective outer surfaces 51 and 50 of the container and cover parts to put gradually increasing pressure upon said surfaces as the cover part is closed and thereby to wedge said members against said surfaces. As best seen in Figs. 1, 2 and 4, the upper edge 44 of the catch member 37 is tapered from the inner end edge 45 thereof, downwardly and outwardly, so that the uppermost part of the catch member at the end edge 45 projects above the surface 36 a greater amount than does the opposite end of said member. The inner wedging surface 46 of the member 37 is also inclined to the outer surface 51 of the container part, the end part of the wedging surface 46 at the end 45 being in forward spaced relation to the outer surface 51, while the other end part 47 of said wedging surface merges into the box surface 51. As the box parts are closed, the higher end portion of the wedging surface passes the outer surface 50 of the cover part before the lower end portion of the wedging surface reaches the surface 50. No contact therefore occurs between the surfaces 46 and 50 until the closing movement is almost completed for the reason that the higher end of the wedging surface is in spaced relation to the surface 50 at the time that the member 44 begins to overlap said surface 50. Engagement of the surfaces 46 and 50 does occur, however, as the closing movement of the box parts is continued. During the final part of such movement, the wedging surface 46 is cammed or pressed against the surface 50 and applies compressive force to the cover part 10, which part is inherently sufficiently resilient to yield enough to permit the box completely until the surfaces 46 and 50 are in pressed contact and the cover part is wedged between the member 37 and the hinge pin.

The catch member 35 is tapered similarly to the member 37 and its inner surface similarly engages the outer surface 51 of the container part to produce the camming or wedging action above described, thereby frictionally to maintain the box in its closed position until it is deliberately opened by spreading the catch members apart.

To aid in maintaining the box in its closed position, an approximately hemi-spherical projection as 52 is made in the innermost end edge 53 of one of the catch members as 35, while a corresponding hemi-spherical depression as 54 is formed in the end edge 45 of the member 37. Since the end edges 45 and 53 are coplanar, it will be understood that pressure is exerted by the projection 52 on the edge 45 as the box parts are brought together toward their closed positions. The inherent resiliency of the plastic parts and the slight play in the hinge permit the projection to pass the nearer portion of the edge 45 and to snap audibly into the depression, adequately to lock the parts together and to apprise the user that the box is locked. In this position, the open side of the slot 13 is lowermost and concealed by the lip 29, while the open sides of the slots 13' are uppermost and concealed by the lips 32 and 33. Between the lips 32 and 33, the unslotted or solid part of the hinge member 15 is uppermost and exposed to view.

Referring now to the form of the invention shown in Figs. 10 to 12, the various pin-receiving slots in the hinge members 60, 61 and 62 are shown aligned (Fig. 11) and the open sides of the slots are at the under side of the box when the box is open. The slots extend throughout the lengths of the various hinge members, and the length of the hinge pin 63 may be made the same as the entire length of the box as shown in Figs. 10 and 12, or somewhat shorter if the extreme ends thereof are not to be visible. The pin may be secured in the slots of the hinge members by a press fit or by any of the means shown in Figs. 7 to 9, or in any other suitable manner, or it may even be comparatively loose in the slots if desired. The overhanging lips 64, 65 are respectively arranged at the rear edge of the cover part 66 on opposite sides of the member 61 and have arcuate inner surfaces as 68 engaging the hinge members 60 and 62 of the container part 67.

In the open position of the box, the lips project sufficiently across the hinge pin slots to prevent the hinge pin from falling out of the slots even though the pin may be or become loose therein. No overhanging or projecting lip need be provided on the rear edge portion of the container part between the hinge members 60 and 62 if such lip is not wanted. However, said rear edge is preferably formed with an arcuate inner surface as 69 engaging the outer surface of the hinge member 61 and thereby preventing the container part from being lifted off the pin and separated from the cover part when the box is open. Similarly, the engagement of the lip surfaces 68 with the members 60 and 62 prevent the cover part from being lifted off the pin and separated from the container part when the box is open. The hinge pin 63 is preferably inserted into the slots therefor by a sliding or longitudinal movement from one end of the aligned slots toward the other. It will be noted that in this form of the invention, the slots are not visible from the top when the box is open, the open sides of the slots being positioned on the under side of the box (Fig. 12).

In Fig. 13, I have shown a somewhat modified form of the box of Figs. 10 to 12, said form being directed to the means for holding the cover part adequately to the container part when the box is open. As shown, said means takes the form of inclined coacting end surfaces on the adjacent hinge members. The end surfaces 70 and 71 on the respective hinge members 72 and 73 and the end surfaces 74 and 75 on the middle hinge member 76 are shown inclined downwardly and outwardly when the box is closed, being then substantially parallel. As the box opens and the member 76 rotates, the surfaces 74 and 75 also rotate to change their inclination and engage and press against the end surfaces 70 and 71 when the box is full open, thereby wedging the hinge member 76 between the adjacent members 72 and 73 to hold the cover part against displacement.

The box may readily be closed, since rotation of the cover part disengages the inclined surfaces. Such rotation also carries the slots out of alignment, whereupon no separation of the parts can occur. The hinge pin 77 shown is shorter than and not coextensive with the slots, so that the ends of the pin are not visible.

Referring to Figs. 14 and 15, I have there shown spaced end overhanging lips 80 on one of the box parts such as the cover part 81 and a middle overhanging lip 82 on the container part 83. The inner surface of the lip on each part is concavely arcuate and engages the convex outer surface of the adjacent hinge member of the other box part. The lips 80 and 82 on each box part are made sufficiently wide to engage the other box part as the box is opened a predetermined amount, thereby to act as stops and to prevent the box parts from being swung open through more than the predetermined angle and thereby to prevent corresponding side faces of the slots from reaching a coplanar position. This is advantageous in cases where the hinge pin as 84 might become loose and tend to fall out of the slots. The hinge pin is inserted endwise into the slots. To conceal at least one end of the pin, the slot 85 in one of the end hinge members as 86, does not extend to the outer end of said member, but terminates inwardly thereof as at 87 and the pin is correspondingly shortened. The end surfaces 88 and 89 of the adjacent hinge members as 86 and 90 may be inclined as shown in Fig. 15 to attain the wedging action hereinbefore described in connection with Fig. 13.

As hereinbefore described, the pin 84 is fixed in the slot or slots of certain hinge members as set forth in connection with the description of the forms of the invention shown in Figs. 1-6 or Figs. 7-9 or Figs. 10-12. Preferably, the slots 85 in the end hinge members 86 are slightly narrower than the slot in the middle hinge member 90 so that the pin is forced into and fixed in the slots 85 and loose in the slot of the member 90 when the parts have been assembled. To aid in fixing the pin in the slots 85, the end portions of the pin may be roughened if desired, in the same manner as the pin ends 25 of Fig. 8.

It will be seen that I have provided a readily moldable hinged plastic box adapted to be inexpensively manufactured and assembled and provided with novel means for preventing the hinge pin from falling out of the hinge slots, as well as with means for maintaining the box parts against separation under all conditions, and have also provided adequate integrally moldable catch or locking members, and that I have provided a box well designed to meet the severe requirements of practical use.

It will also be seen that I have provided a simple hinge adapted to be formed integrally by a molding operation on the end edges of the parts of a plastic box, or on the adjacent hinged parts of any suitable molded article. Where I refer to a box herein, I intend the term "box" to include any suitable molded article provided with an integral hinge.

Various changes may be made in the specific forms of the invention shown and described without departing from the spirit thereof, as defined in the appended claims.

I claim:

1. In a moldable hinge, a first hinge part, a second hinge part and a hinge pin connecting said parts, one of the parts being swingable about the pin selectively into an open position and into a closed position, a first cylindrical hinge member extending rearwardly from the rear edge of the first part, a second cylindrical hinge member extending rearwardly from the rear edge of the second part when the parts are in the closed position, each of the hinge members being of lesser length than that of the rear edge of the corresponding part and of greater diameter than the thickness of said rear edge, each of the hinge members having a radial slot therein open along one side, the hinge members being longitudinally aligned, the pin being arranged in the slots of said members, the side walls of each of the slots being flat and parallel to each other and spaced apart a uniform distance in each slot, the width of the slot in the first hinge member being less than the width of the slot in the second hinge member whereby when the pin is forced into the slot of the first hinge member, said pin is fixed therein against movement relatively thereto in any direction, the pin fitting rotatably in the slot of the second hinge member, and an overhanging lip on the rear edge of one of the hinge parts, said lip being adjacent the hinge member of that one of the parts on which said lip is provided, said lip having a concave surface adjacent the outer surface of the hinge member of the other of the hinge parts and being of substantially the same diameter as that of said outer surface, said lip projecting rearwardly in said closed position past a vertical plane tangent to the front of the pin.

2. In a molded hinge, a first hinge part having a cylindrical hinge member provided with a slot having an open side and having parallel side walls, a second hinge part having a similar cylindrical hinge member provided with a similar slot having an open side and parallel side walls, a hinge pin passing through the slots of the members and fixed in the slot of one of the members against movement in any direction relatively to said one of the members and comparatively loose in the slot of the other member whereby said other member is rotatable relatively to the pin into a closed position, and an overhanging lip having a concave surface on the rear edge of one of the hinge parts, the concave surface of said lip engaging and being of the same diameter as the cylindrical surface of the adjacent hinge member of the other hinge part and of sufficient width to extend rearwardly in said closed position past a vertical plane tangent to the front of the pin.

3. A molded hinge according to claim 2 in which means are provided for wedging the hinge parts against accidental movement out of a selected open position of the hinge, said means comprising an end surface on one end of one hinge member inclined at an angle other than a right angle to the axis of said one hinge member, and an adjacent end surface on the adjacent end of the other hinge member parallel to the first mentioned end surface when the hinge is closed.

4. A molded hinge according to claim 2 in which the pin is secured in place within the slot of said one of the hinge members by a roughened surface on the pin in forced engagement with the bottom of the slot.

5. In a molded hinge, a first molded part having a rear edge, a first cylindrical hinge member extending rearwardly from the middle portion of said rear edge, a second molded part having a rear edge, a pair of transversely spaced apart second and third cylindrical hinge members of the same diameter as the first hinge member extending rearwardly from the end portions of the rear edge of the second molded part and providing a recess therebetween for the reception of the first hinge member, said hinge members being in axial alignment with each other and having a common axis, each of the hinge members having a radial slot more than half way therethrough, the slot of each member being open along one side and having parallel flat spaced apart side walls joined by a semi-cylindrical interior wall arranged concentrically about said common axis, and a cylindrical pin in the slots of the members and engaging the interior walls of the slots, said pin being fixed in the slots of the second and third hinge members, the first hinge member being relatively rotatable about the pin into an open position and into a closed position of the hinge, those portions of the rear edge of the first hinge part on each side of the first hinge member being concave and projecting rearwardly in the closed position past a vertical plane tangent to the front of the pin and being concentric with said axis, the concave portions of the rear edge of said first part being of substantially the same diameter as that of the second and third hinge members to form a pair of lips on said rear edge portions of said first part overhanging and engaging substantial areas of the second and third hinge members respectively.

6. A molded hinge according to claim 5 in which means are provided for wedging the hinge parts against accidental movement out of a selected open position of the hinge, said means comprising an end surface on one end of the first hinge member inclined at an angle other than a right angle to the axis of the hinge members, an end surface on the other end of the first hinge member inclined to the axis in a different direction from the direction of inclination of the end surface on said one end, an end surface on the second hinge member adjacent one of the end surfaces of the first hinge member and substantially parallel thereto when the hinge is closed, and an end surface on the third hinge member adjacent the other end surface of the first hinge member and parallel thereto when the hinge is closed.

7. A molded hinge according to claim 5 wherein the first hinge member is provided with a pair of opposed convergent end surfaces and the second and third hinge members each have an end surface parallel to and adjacent a different end surface of the first hinge member when the hinge is closed and adapted to wedge against said adjacent end surface when the hinge is opened.

8. A molded hinge according to claim 7 wherein the lips extend rearwardly a sufficient distance to engage the second hinge part when the hinge is incompletely open thereby to serve as stops preventing full opening of the hinge.

9. A molded hinge according to claim 5 wherein the rear edge of the recess of the second hinge part is provided with a projecting lip having a concave surface of substantially the same diameter as that of the first hinge member and extending rearwardly when the hinge is closed past said tangent plane.

10. A molded hinge according to claim 9 wherein the respective opposite end surfaces of the first hinge member are each inclined at an angle other than a right angle to the axis of the members, and the end surfaces on the adjacent respective ends of the second and third hinge members are parallel respectively to the respective adjacent surfaces of the first hinge member when the hinge is closed.

11. A molded hinge according to claim 9, the lips on the first hinge part extending rearwardly sufficiently past said tangent plane when the hinge is closed to project rearwardly past the axis of the pin, and also concealing parts of the slots in the second hinge member when the hinge parts are rotated relatively to each other about the pin into an open position of the hinge.

12. A molded hinge according to claim 9, the lips on the first hinge part extending rearwardly past the axis of the pin and also respectively concealing parts of the slots in the second and third hinge members when the hinge is closed, the lip on the second hinge part preventing removal of the first hinge part from the pin in an open position of the hinge parts.

PHILIP A. DERHAM.

REFERENCES CITED

The following references are of record in the file of this patent:

UNITED STATES PATENTS

| Number | Name | Date |
|---|---|---|
| 2,012,800 | Allen | Aug. 27, 1935 |
| 2,200,399 | Primas | May 14, 1940 |
| 2,244,276 | Ward et al. | June 3, 1941 |
| 2,365,378 | Benson | Dec. 19, 1944 |
| 2,372,969 | Michals | Apr. 3, 1945 |